United States Patent [19]

Astier et al.

[11] Patent Number: 5,569,422
[45] Date of Patent: Oct. 29, 1996

[54] METHOD OF MAKING PARTS OUT OF AN ALUMINA MATRIX COMPOSITE MATERIAL

[75] Inventors: Jean-Pierre Astier, Pessac; Christian Bertone, Castelnau de Medoc; Jean-Philippe Rocher, Le Haillan, all of France

[73] Assignee: Societe Europeenne de Propulsion, Suresnes, France

[21] Appl. No.: 210,646

[22] Filed: Mar. 18, 1994

Related U.S. Application Data

[63] Continuation of Ser. No. 899,638, Jun. 16, 1992, abandoned.

[30] Foreign Application Priority Data

Jun. 17, 1991 [FR] France .................................. 91 07393

[51] Int. Cl.⁶ .................................................. C04B 35/80
[52] U.S. Cl. ............................ 264/60; 264/136; 264/137; 264/258; 501/95
[58] Field of Search ............................ 264/60, 136, 137, 264/258; 501/95

[56] References Cited

U.S. PATENT DOCUMENTS

| | | | |
|---|---|---|---|
| 3,709,717 | 1/1973 | Hamling | 117/70 C |
| 4,092,194 | 5/1978 | Green | 427/376.2 |
| 4,568,594 | 2/1986 | Hordonneau | 264/60 |
| 4,814,127 | 3/1989 | Toyoda | 264/56 |
| 4,983,422 | 1/1991 | Davis et al. | 427/228 |
| 5,024,978 | 6/1991 | Allaire | 264/63 |

FOREIGN PATENT DOCUMENTS

| | | |
|---|---|---|
| 0130105 | 1/1985 | European Pat. Off. . |
| 2526785 | 11/1983 | France . |
| 2589855 | 5/1987 | France . |

*Primary Examiner*—James Derrington
*Attorney, Agent, or Firm*—Weingarten, Schurgin, Gagnebin & Hayes

[57] ABSTRACT

A part is made of a composite material having an alumina matrix by impregnating a fiber texture with a fluid composition containing a liquid precursor of alumina, a thermoplastic resin, and a suspension of alumina powder, and subsequently convening the precursor into alumina. Additional solid fillers may be added to the impregnation composition. The impregnated fiber texture is preferably made by draping and molding plies that are pre-impregnated with said composition.

6 Claims, 1 Drawing Sheet

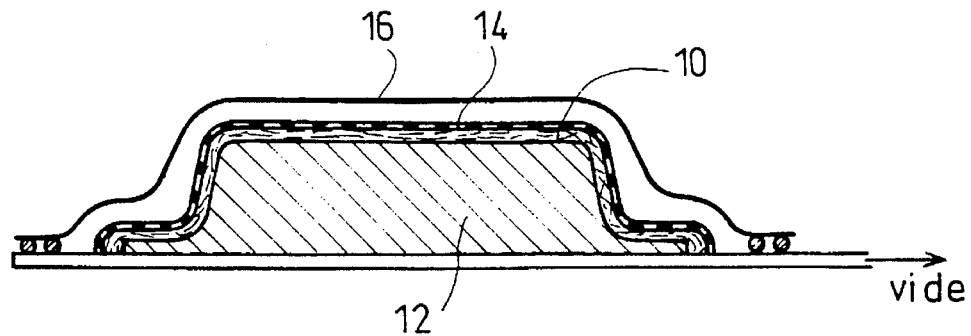
fig_1
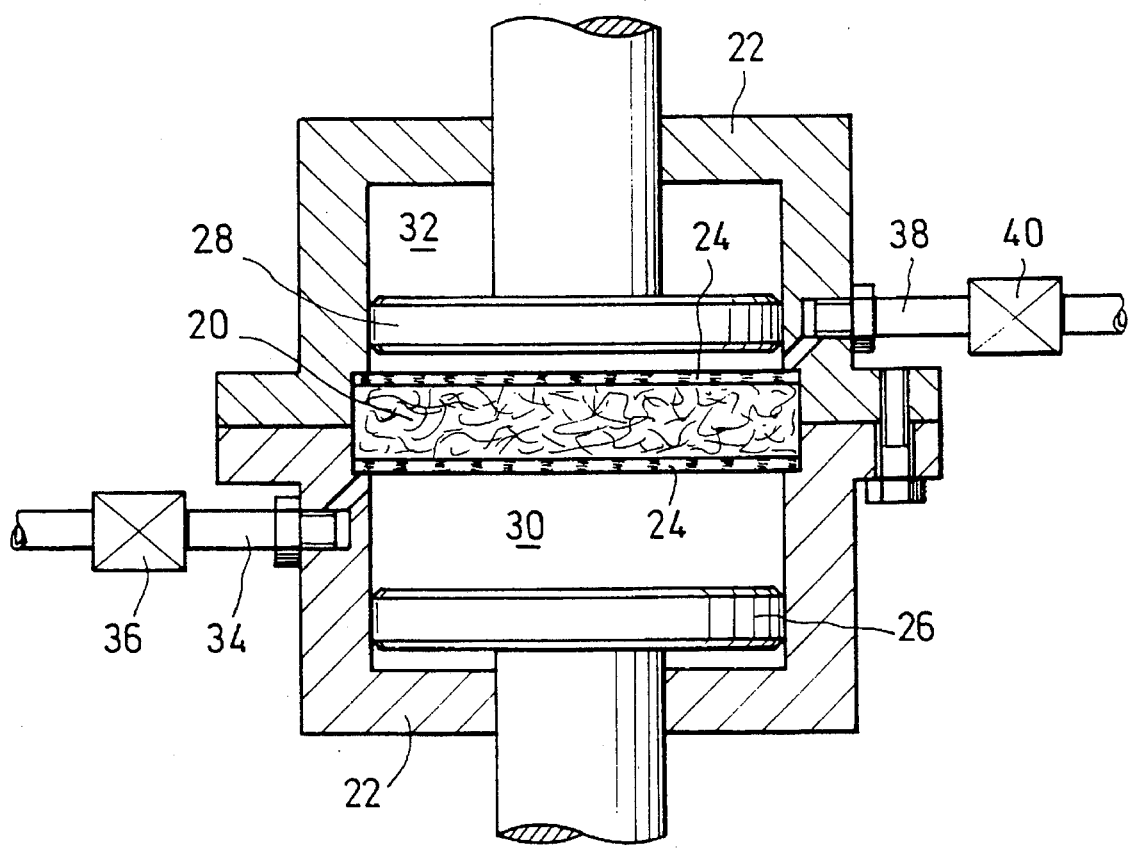
fig_2

METHOD OF MAKING PARTS OUT OF AN ALUMINA MATRIX COMPOSITE MATERIAL

This application is a continuation of application Ser. No. 07/899,638, filed Jun. 16, 1992, now abandoned.

The present invention relates to making parts out of a composite material comprising a fiber reinforcing fabric or "texture" densified by an alumina matrix.

BACKGROUND OF THE INVENTION

Several techniques exist for densifying a fiber texture with a matrix of alumina, in particular techniques that make use of a liquid.

One known method consists in impregnating the fiber texture on successive occasions with a liquid composition that constitutes a precursor of alumina. After each impregnation, the texture is dried and subjected to heat treatment to convert the precursor into alumina. That method has the drawback of being lengthy and expensive to implement. It is usually necessary to perform numerous consecutive cycles of impregnation-drying-heat treatment to achieve the desired degree of densification.

Another known method, described in particular in Document FR-A-2 526 785 consists in sucking a very fine powder of alumina in suspension in a liquid through the fiber texture. After being infiltrated with alumina powder, the texture is dried and is subjected to sintering heat treatment. That technique of is applicable only to making parts that are small in size and simple in shape. In addition, the grains of alumina within the matrix are bonded together only weakly.

In Document FR-A-2 091 419, a method is described comprising impregnating fibrous zirconia with a liquid containing zirconia powder and a liquid precursor of zirconia. The fibrous zirconia impregnated in this way is deposited on a metal part that is coated with a porcelain enamel, and the entire assembly is dried and heated. Once those operations have been performed, a metal part is obtained which is coated with zirconia and which can be used with success in environments that are hot and corrosive; the method used achieving a good metal-ceramic bond.

Another technique is described in Document EP-A-0 130 105. It consists initially in impregnating a three-dimensional (3D) texture of refractory fibers with a suspension of ceramic powder in a liquid containing a very small quantity of a resin (polyvinyl alcohol). After drying, the ceramic grains occupy the larger pores of the 3D texture (filling of the macropores). In order to densify the material completely, the 3D texture with its ceramic grains is impregnated by means of a liquid precursor of a ceramic so as to fill the micropores. The part is then subjected to heat treatment to transform the liquid precursor into ceramic and to eliminate the resin. The latter operations of impregnation and heat treatment are repeated several times. That method makes it possible to densify a 3D fiber texture relatively quickly without using pressure.

An object of the present invention is to provide an improved method enabling a fiber reinforcing texture to be densified with an alumina matrix by using a liquid.

SUMMARY OF THE INVENTION

This object is achieved by a method including a step of impregnating the fiber texture with a fluid composition containing a precursor of alumina and a subsequent step of convening the precursor into alumina by heat treatment, in which method, according to the invention, the fiber texture is impregnated by a composition comprising the precursor of alumina, a thermoplastic resin, and alumina powder in suspension.

The alumina powder is very fine, preferably having submicron grains.

The thermoplastic resin acting as a binder is selected so as to leave practically no solid residue after heat treatment. By way of example, a polymethacrylate may be selected as said temporary resin, e.g. polymethyl methacrylate (PMMA).

Compared with the known method which consists in impregnating the fiber texture on successive occasions with a liquid composition that constitutes a precursor of the matrix, the method of the invention has the advantage of enabling densification to be performed much more quickly. It is therefore considerably shorter and less expensive.

Compared with the known method that consists in sucking an alumina powder in suspension in a liquid through the texture, the method of the invention does not put a limit on the size or shape of the parts to be made. It also makes it possible to obtain materials having reduced porosity.

It is essential to add the alumina precursor and the thermoplastic resin to the alumina powder in order to achieve bonding between the grains of alumina powder in the matrix.

In this respect, it has been observed that the presence of the liquid precursor of alumina and of the alumina powder only is insufficient since it leads to a composite that delaminates, i.e. having a "flaky" matrix without real cohesion. In spite of its temporary nature, i.e. in spite of it being absent from the finished material, the presence of the thermoplastic resin as well is absolutely essential.

The thermoplastic resin must therefore be present in significant quantity. The weight percentage of the resin in the impregnating composition is preferably not less than 5%.

The composition of the impregnating mixture is preferably as follows:

liquid precursor of alumina, 80 parts to 120 parts by weight;

thermoplastic resin, 5 parts to 20 parts by weight; and solid filler, 60 parts to 100 parts by weight.

The solid filler is totally or essentially constituted by the alumina powder. Other fillers that may possibly be present to confer special properties on the composite material include, for example, magnetic fillers (ferrite powder), a ceramic powder (e.g. silicon nitride), or ceramic whiskers.

In a preferred implementation of the invention, the impregnated fiber texture is formed by draping and molding plies that have been pre-impregnated with a composition including an alumina precursor, a thermoplastic resin, and alumina powder in suspension.

The thermoplastic resin makes it possible to achieve very good bonding between the pre-impregnated plies, giving the necessary cohesion to the final material.

It is possible to impregnate the plies constituting different portions of the texture with impregnation compositions that differ from one another as to the content of additional solid fillers contained in each impregnation composition. Thus, the distribution of fillers through the final composite material can be controlled, in particular to obtain a predetermined gradient of fillers through the composite.

BRIEF DESCRIPTION OF THE DRAWINGS

Particular implementations of the invention are described below by way of non-limiting indication.

FIGS. 1 and 2 of the accompanying drawing are highly diagrammatic illustrations of two implementations of the method of the invention.

DETAILED DESCRIPTION

The field of the invention is that of composite materials having fiber reinforcement and on alumina matrix. More particularly, it is that of refractory composite materials in which both the matrix and the fiber reinforcing texture are refractory, and in particular are ceramic. By way of example, the reinforcing texture fibers may be made of silicon fiber or of alumina, thus giving composite materials of the $SiC/Al_2O_3$ type or of the $Al_2O_3/Al_2O_3$ type.

The reinforcing texture is formed by draping two-dimensional plies, e.g. plies of cloth, of fiber web, or of felt, or they may be sheets of threads or cables, or the texture may be three-dimensional, e.g. a mat, a felt, . . .

EXAMPLE 1

In this example, the reinforcing texture is made up of plies of silicon carbide fiber cloth (SiC cloth), and in particular made of fibers produced under the name "Nicalon" by the Japanese company Nippon Carbon.

An impregnation composition is prepared with the following ingredients:

57% by weight of liquid precursor of alumina constituted by aluminum oxichloride;

34% by weight of sub-micron alumina powder; and

9% by weight of temporary resin constituted by polymethyl methacrylate (PMMA).

Prior to being used for impregnating the SiC cloth, the impregnation composition is mixed for at least 24 hours so as to obtain a homogeneous mixture.

The pre-impregnated cloth is dried, e.g. by being passed along a hot tunnel.

A preform of a composite part is made by draping plies of dry pre-impregnated SiC cloth and by molding in an autoclave, using a technique that is well known.

As shown in FIG. 1, the plies of pre-impregnated cloth 10 are draped over tooling 12 having the shape of the part to be manufactured. The plies 10 are held on the tooling by means of a perforated rigid metal sheet 14 itself covered by an airtight flexible covering 16. This constitutes a bag in which a reduced pressure or a raised pressure can be established by connection to a vacuum source or to a pressure source (not shown).

A baking cycle is performed during the molding operation in which the temperature is raised progressively to 250° C.–300° C. During this rise in temperature, the thermoplastic resin which is intimately mixed with the fillers and with the liquid precursor of alumina is softened. This softening (associated with the application of high pressures or of reduced pressure) provides good bonding, imbricating together the pre-impregnated plies.

Thereafter, and around 180° C., the liquid precursor of alumina (aluminum oxichloride) transforms into hydrated alumina. During this transformation, the imbrication of the plies and the bonds between them continue to be provided by the resin.

Towards 250° C.–300° C., the transformation of alumina oxichloride to hydrated alumina is completed. The plies of pre-impregnated cloth are then securely bonded together and the part molded in this way holds together mechanically.

The resulting part is then removed from the autoclave and is raised to 850° C. in an oven at atmospheric pressure in order to pyrolyze the resin (which is no longer required for holding the part together) and to dehydrate the alumina.

The pan made in this way has a residual porosity of 30%. To complete densification thereof, it is subsequently impregnated (without the tooling) 3 to 4 times using the same liquid precursor of alumina as has already been used (i.e. aluminum oxichloride). After each occasion on which it is impregnated, a cycle of baking at 250° C. and of pyrolysis up to 850° C. is performed.

Once these operations have been completed, a part is obtained made of $SiC/Al_2O_3$ composite material having a residual open porosity of less than 15% and in which the plies of the fiber reinforcement are securely bonded together.

EXAMPLE 2

A pre-impregnated cloth is obtained by impregnating the same cloth as that used in Example 1, by means of a composition containing:

62.5% by weight of liquid precursor of alumina (aluminum oxichloride); and 37.5% by weight of sub-micron alumina powder.

It should be observed that the percentages of oxichloride and of filler are in the same ratio as in the impregnation composition of Example 1.

After the pre-impregnated cloth has been dried, it is cut up into plies which are molded in an autoclave at up to 300° C. as described in Example 1.

On being removed from the autoclave, the part is unsuitable for handling; the plies of cloth constituting it do not hold together (delamination).

This phenomenon is due to the absence of thermoplastic resin in the impregnation composition, thus preventing the plies of pre-impregnated cloth imbricating during molding and holding together while the alumina oxichloride is being transformed into hydrated alumina.

EXAMPLE 3

A pre-impregnated cloth is obtained by impregnating the same cloth as was used in Example 1, with a composition containing:

86% by weight of liquid precursor of aluminum constituted by aluminum oxichloride; and 14% by weight of thermoplastic resin (PMMA).

It should be observed that the percentages of oxichloride and of resin are in the same ratio as in the impregnation composition of Example 1.

A part is then manufactured using this pre-impregnated cloth by molding in an autoclave to 250° C. to 300° C., followed by pyrolysis in an oven at atmospheric pressure up to 850° C., as in Example 1.

The resulting part has residual porosity lying in the range 40% to 45%. To complete densification thereof so as to achieve a residual porosity of less than 15%, it is necessary to perform 7 to 8 cycles of impregnation with the liquid precursor of alumina (aluminum oxichloride) as already used for making the pre-impregnated cloth; each impregnation is followed by a cycle of baking at 250° C. and of pyrolysis up to 850° C., as in Example 1.

It should be observed that to achieve the same degree of densification as in Example 1, it is necessary to perform twice as many re-impregnation operations with aluminum oxichloride, thereby considerably lengthening manufacturing time.

EXAMPLE 4

A pre-impregnated cloth is obtained by impregnating the same cloth as used in Example 1 but using a composite containing:

- 50% by weight of sub-micron $Al_2O_3$ power;
- 5% by weight of temporary thermoplastic resin of the polyvinyl alcohol type;
- 5% basic deflocculating agent; and
- 40% water.

The pre-impregnated cloth is subsequently used as described in Example 1 by being pressed in an autoclave.

After pressing, it is observed that there is no bonding between the plies of pre-impregnated cloth, and that the resulting part does not hold together.

The above composition of the type described in Document EP-A- 0 130 105 consequently turns out to be unsuitable for making parts by molding plies of pre-impregnated cloth.

EXAMPLE 5

The part is made as described in Example 1 except that the cloth of silicon carbide fibers is replaced by a cloth of alumina fibers ($Al_2O_3$) as sold by the company SUMITOMO. The $Al_2O_3/Al_2O_3$ composite part obtained in this way has good thermomechanical characteristics and low emissivity (in the range 0.3 to 0.4) for wavelengths of 3.5 microns to 10 microns and for temperatures in the range 600° C. to 1000° C.

EXAMPLE 6

The part is made as follows:

- a cloth of $Al_2O_3$ fibers sold by SUMITOMO is impregnated with an impregnation composition containing 57% by weight of aluminum oxichloride, 34% by weight sub-micron alumina powder, and 9% by weight polymethyl methacrylate (pre-impregnate 1);
- another piece of the same cloth made of alumina fibers as sold by SUMITOMO impregnated with an impregnation composition containing 57% by weight of aluminum oxichloride, 34% by weight sub-micron silicon nitride ($Si_3N_4$), and 9% PMMA (pre-impregnate 2);
- the two pre-impregnated cloths obtained in this way are then dried, and 100 mm×100 mm plies are cutout therefrom;
- ten plies of pre-impregnate 1 are then stacked and one ply of impregnate 2 is placed on said stack; and
- the assembly is then molded in an autoclave and is pyrolyzed as described in Example 1.

The resulting material is identical to that of Example 5 except for the fact that the top ply of the material contains $Si_3N_4$ instead of alumina.

The mechanical characteristics in traction of said materials are identical, however, the material made as described in this Example 6 has higher emissivity than that of the material in Example 5.

EXAMPLE 7

A composite part made of $Al_2O_3/Al_2O_3$ is made as follows:

- a cloth of $Al_2O_3$ fibers as sold by SUMITOMO is impregnated with a composition containing 57% by weight aluminum oxichloride, 34% by weight sub-micron alumina powder, and 9% by weight PMMA (pre-impregnate A);
- another piece of the same cloth of $Al_2O_3$ fibers is impregnated with a composition containing 57% by weight aluminum oxichloride, 32% by weight sub-micron alumina powder, 2% by weight graphite powder, and 9% by weight PMMA (pre-impregnate B);
- another piece of the same cloth of $Al_2O_3$ fibers is impregnated with a composition containing, by weight, 57% aluminum oxichloride, 30% sub-micron alumina powder, 4% graphite powder, and 9% PMMA (pre-impregnate C);
- another piece of the same cloth of $Al_2O_3$ fibers is impregnated with a composition containing, by weight: 57% aluminum oxichloride, 28% sub-micron alumina powder, 6% graphite powder, and 9% PMMA (pre-impregnate D); and
- all four pre-impregnates made in this way are dried and 100 mm×100 mm plies are cut out from said pro-impregnated cloths.

The following stack is then made:

- 4 plies of pre-impregnate A
- 4 plies of pre-impregnate B
- 4 plies of pre-impregnate C
- 4 plies of pre-impregnate D.

The assembly is then molded at 250° C. under pressure and pyrolyzed at 850° C. under an inert atmosphere.

The resulting material has mechanical properties in traction that are identical to those of the composite made in Example 5.

In contrast, the graphite filler gradient obtained through the material transforms the $Al_2O_3/Al_2O_3$ composite of Example 5 (which material is transparent to radar waves), into a material that absorbs radar waves. Compared with a reflecting material, attenuation of 10 dB is observed at 10 GHz. This technique which makes it possible to incorporate a graphite filler gradient gives rise to a high performance ceramic matrix composite having characteristics that are advantageous from the point of view of stealth with respect to radar waves.

This characteristic of the method of the invention makes it possible to control the way in which a filler is incorporated in the material, thereby conferring special properties thereto (emissivity, radar stealth, . . . ).

EXAMPLE 8

This example relates to making a radome of $Al_2O_3/Al_2O_3$ composite material. The reinforcing texture is constituted by a mat of alumina fibers sold by the company ICI under the name "Saffil" mat.

As illustrated by FIG. 2, a disk-shaped piece of reinforcing texture 20 is placed in an enclosure 22 between two screens 24 made of perforated metal plates. On opposite sides of the texture 20, pistons 26 and 28 slide in chambers 30 and 32 delimited by the enclosure 22 and by the texture. A duct 34 for admitting an impregnating composition and provided with a stop valve 36 terminates in one of the chambers (e.g. chamber 30) passing through the wall of the enclosure in the immediate proximity of the location of the texture 20. A suction duct 38 provided with a stop valve 40 and connected to a vacuum source (not shown) opens out into the other chamber 32 in the immediate proximity of the location of the texture 20, passing through the wall of the enclosure in a region thereof that is opposite to the region into which the duct 34 opens out.

An impregnation composition is prepared having the following ingredients:

- 100 parts by weight of a liquid precursor of alumina constituted by aluminum oxichloride;
- 70 parts by weight of sub-micron alumina powder; and
- 15 parts by weight of thermoplastic resin constituted by polymethyl methacrylate.

After the reinforcing texture 20 has been installed between the screens 24, a vacuum is established inside the enclosure, with the valve 36 closed and the valve 40 opened. Thereafter, the valve 36 is opened to admit a determined quantity of impregnation composition into the chamber 30 of the enclosure. This composition is forced to pass through the reinforcing texture 20 by the reduced pressure which continues to be exerted in the chamber 32.

After a predetermined length of time that is sufficient for the entire texture 20 to have had the impregnation composition pass therethrough, the valve 40 is closed.

The pistons 26 and 28 are then driven synchronously to force the impregnation composition to pass several times through the reinforcing texture 20 in one direction and in the opposite direction. As a result the texture is impregnated homogeneously.

The impregnated reinforcing texture as retained between the screens 24 is then removed from the enclosure to be subjected to a baking cycle. As before, this cycle consists in placing the reinforcing texture in a press or in an autoclave and in raising its temperature to about 250° C. to 300° C. progressively and with intermediate pauses.

A ceramization cycle is then performed in an oven where the temperature is raised progressively to 950° C., thereby obtaining a radome of the desired composite $Al_2O_3/Al_2O_3$ material, after stabilization at 1400° C.

The resulting material has the desired electromagnetic characteristics (real permittivity, loss angle, . . . ) in a manner that is reproducible.

EXAMPLE 9

A radome is made as described in Example 8 except that the impregnation composition does not contain polymethyl methacrylate, while the quantities of aluminum oxichloride and of sub-micron alumina powder are the same as in Example 8.

The material obtained in this way suffers from delimitation between its plies, as described above in Example 2 for materials having an alumina matrix with two-dimensional cloth reinforcement.

In addition, the electromagnetic characteristics of the material are not reproducible because a filler gradient and an overall filler percentage vary from one composite material to another and also within a given composite.

This is due to the fact that in the absence of a thermoplastic resin, the fillers creep in non-reproducible manner while the material is subjected to hot pressing.

We claim:

1. A method of making a part of composite material comprising a fibrous reinforcing texture densified by an alumina matrix, the method comprising the steps of:
   - providing two-dimensional fibrous plies,
   - impregnating the two-dimensional fibrous plies with a fluid composition comprising a liquid precursor of alumina, alumina powder in suspension, and a thermoplastic resin, the fraction by weight of thermoplastic resin in the composition being greater than 5%,
   - draping and molding said impregnated plies,
   - heat treating the impregnated plies during molding to cause the thermoplastic resin to soften and bond together the impregnated plies, and
   - heat treating the molded plies to cause the precursor to be transformed into alumina and the resin to be pyrolyzed, whereby alumina resulting from the transformed precursor bonds the plies together to hold the part together mechanically.

2. A method according to claim 1, wherein additional solid fillers are added to the impregnation composition.

3. A method according to claim 2, wherein plies are impregnated with respective impregnation compositions which differ from one another in the fraction of additional solid fillers included therein.

4. A method according to claim 3, wherein the fractions of solid fillers included in the impregnation compositions and the disposition of the impregnated plies are determined to achieve a predetermined filler gradient through the composite material.

5. A method as claimed in claim 1, wherein said fluid composition comprises 80 parts to 120 parts by weight of a liquid precursor of alumina, 60 parts to 100 parts by weight of alumina powder in suspension and 5 parts to 20 parts by weight of thermoplastic resin.

6. A method of making a part of composite material comprising a fibrous reinforcing texture densified by an alumina matrix, the method comprising the steps of:
   - providing two-dimensional fibrous plies,
   - impregnating the two-dimensional fibrous plies with a fluid composition comprising a liquid precursor of alumina, alumina powder in suspension, and a thermoplastic resin, the fraction by weight of thermoplastic resin in the composition being not less than 5%,
   - draping and molding said impregnated plies,
   - heat treating the impregnated plies during molding to cause the thermoplastic resin to soften and bond together the impregnated plies, and
   - heat treating the molded plies to cause the precursor to be transformed into alumina and the resin to be pyrolyzed, whereby alumina resulting from the transformed precursor bonds the plies together to hold the part together mechanically.

\* \* \* \* \*